United States Patent Office 3,403,111
Patented Sept. 24, 1968

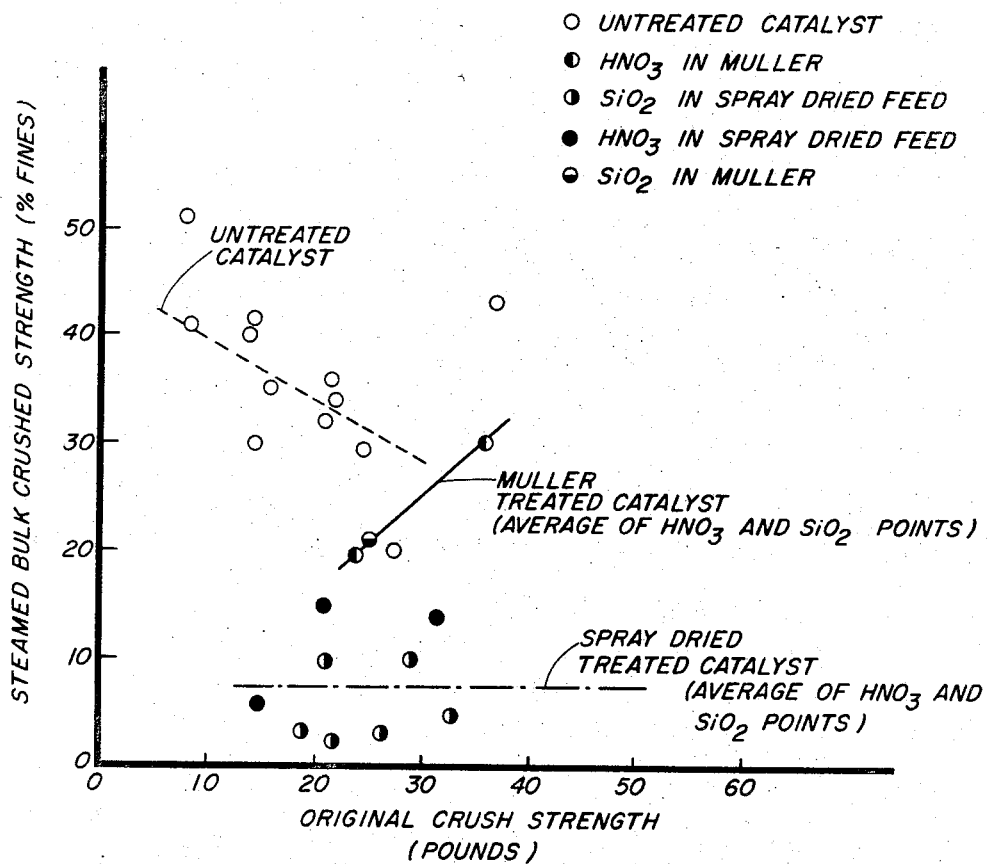

3,403,111
PREPARATION OF AN ALUMINA
CATALYST SUPPORT
Joseph Dennis Colgan and Norman Ostroff, Stamford, Conn., assignors to American Cyanamid Company, Stamford, Conn., a corporation of Maine
Filed Oct. 8, 1965, Ser. No. 494,143
3 Claims. (Cl. 252—465)

ABSTRACT OF THE DISCLOSURE

A method for obtaining a molybdenum promoted alumina base extruded catalyst having improved crush strength after regeneration which comprises treating a hydrous alumina slurry with nitric acid, forming an extrusion mixture of said treated alumina and a molybdenum promoter and extruding said mixture.

---

This invention relates to a process of preparation of fixed-bed silica-free catalysts of the type employed in the desulfurization of hydrocarbon fractions such as petroleum gases, vapors, and liquids, and further relates to the catalyst compositions prepared by the process.

More particularly, the invention relates to a process and catalyst prepared thereby wherein the prepared catalyst is a silica-free extrudate characterized by a high degree of retention of crush strength after regeneration, as simulated by exposure to steam.

Typical fixed-bed catalysts used for hydrodesulfurization initially passes high catalytic activity and relatively high mechanical strength. Catalytic activity and catalyst strength, however, gradually deteriorate in use and for these reasons catalysts must be discarded after relatively short times. Deterioration in catalytic activity is known to be due in part to coke deposition on the catalyst during use. As a result, it is common practice to periodically regenerate the catalyst. This is usually accomplished by steam stripping the residual oil and, then, burning off the deposited coke.

The reasons for loss in mechanical strength are not well understood. It is known that the strength loss takes place in use but more particularly under the high temperature conditions used in regeneration, and further that this strength loss is catalyzed by the presence of $MoO_3$. Loss of strength is undesirable and frequently necessitates replacement of the catalyst because large quantities of fines are produced which are detrimental to the proper functioning of the catalyst bed, as evidenced by excessive pressure drop or poor flow distribution in the bed.

Many methods have been proposed to strengthen or harden the fixed bed catalysts, pellets or extrudates, but these methods, for the most part, deal only with the strength of the fresh catalyst. While an improvement in the strength of the fresh catalyst will generally improve the strength of the used and regenerated catalyst to some extent, the improvement is not appreciable.

One method which has been proposed to improve the strength of used and regenerated hydrodesulfurization catalysts involves the addition of 1–15% silica. While this method imparts the desired increase in strength of the used and regenerated catalyst, it also imparts some cracking activity to the catalyst which may be undesirable.

This invention relates to an improvement in the strength stability of alumina-supported, formed catalysts used for hydrodesulfurization. It has been discovered that these catalysts, containing a compound of the metals, Ni, Co, and particularly Mo, and chemical compositions of such compounds, have improved strength stability when nitric acid is added to the alumina support in a particular method and at a specific concentration.

Strength stability may be defined as the physical strength of the formed catalyst after extended use and repeated regeneration.

It should be noted that the improvement is not directed primarily to improved strength in the fresh catalyst, but is primarily directed to improved regenerated catalyst properties, and secondarily is directed to the combination of both improved regenerated catalyst properties and improved fresh catalyst properties. Improved fresh strength may be obtained by a variety of methods, but these improvements, however, do not necessarily result in any appreciable improvement in strength stability. By the methods of this invention, the strength stability is markedly improved while the strength and density of the fresh catalyst are not appreciably changed. The strength of the fresh catalyst of this invention may, in fact, by some methods be less than that frequently obtained by some other methods.

It is an object of this invention to obtain a process for the preparation of a fixed-bed silica-free type catalyst which retains a high crush strength after successive regenerations.

Another object is to obtain a catalyst which retains a high crush strength after successive regenerations.

Other objects of this invention become apparent from the preceding and following disclosures.

The objects of this invention are obtained in the preferred embodiment by (1) treating a precipitated alumina slurry with nitric acid, (2) preferably spray-drying, (3) followed by subsequently preparing (admixing) an extrusion feed of the treated alumina, (4) extruding, and (5) drying and calcining the catalyst. Alternatively, in a less effective method, the treating nitric acid may be added during the extrusion-feed-admixing (mulling) step of preparing the extrusion feed from the precipitated alumina and water, for example.

The figure illustrates the high degree of crush strength retention after regeneration of treated catalyst, the relationship thereto of the crush strength of fresh catalysts prior to regeneration or steam treatment, and the relationship thereto of untreated catalysts both before and after regeneration.

It is within the scope of this invention to employ any precipitated alumina slurry independent of the method of preparation. It is critical to this invention that the nitric acid treatment be employed at a stage after the precipitated alumina slurry has already been at least substantially formed. But, it is also within the scope of the invention to treat with a nitric acid substantially simultaneous to the precipitation of the alumina after precipitation has already been initiated, rather than after precipitation is complete in its entirety. The retention of crush strength is not obtained when the nitric acid treatment is merely included with the sulfuric acid treatment or with the alkali treatment typically employed in the conventional method of preparing the precipitated alumina.

The preferred catalysts characterized by a high degree of retention of crush strength after regeneration, including steam treatment, is obtained by the process as follows.

Hydrated alumina is divided into a first and a separate second portion. The first portion is treated with an alkali such as sodium hydroxide or other typical alkali, sufficiently to form an aluminate such as sodium aluminate. The second portion is treated with a sulfate anion, such as with sulfuric acid, sufficiently to form alum, i.e., aluminum sulfate. The aluminate portion and the alum portion are then subsequently admixed and maintained substantially simultaneously (during the admixing) at a preferred pH 7.5 to about pH 8.5. The pH in any event should be maintained on the alkaline side. The precipitated alumina is preferably washed and preferably is admixed with a sufficient amount of diluent, preferably water, to obtain desired flow properties; and nitric acid is admixed therewith to treat the precipitated alumina. The treated catalyst is thereafter reduced in moisture (water) content (preferably spray-drying at least a portion thereof), mulled with sufficient diluent and/or precipitated alumina to form an extrusion feed, extruded, and dried and calcined. The nitric acid employed in this process is typically any commercially available aqueous nitric acid, normally the conventional (about 69–71%) nitric acid solution.

The nitric acid treatment employs from any minimal effective amount, about 1%, up to about 8% by weight of $HNO_3$ to alumina. If too high a percentage is employed, extrusion becomes difficult if not impossible because of the sticky mass which results. Example 19 (below) illustrates the upper-limit extreme difficulty. The preferred range of nitric acid (as $HNO_3$) is from about 2% to about 5%, based on total alumina.

After the precipitated alumina slurry has been treated with nitric acid (in the preferred embodiment), the flow properties are adjusted, and optionally promoters such as nickel-molybdenum or cobalt-molybdenum, or other conventional promoters are admixed therewith. Treated alumina is then extruded and thereafter the extrudate is dried and calcined.

It should be noted that following the nitric acid treatment discussed above, it is within the scope of this invention first to spray dry the treated alumina and to subsequently prepare the extrusion feed by adding an appropriate amount of diluent and/or promoters, and other desired ingredients to the extrusion feed.

It is also within the scope of this invention to supplement the nitric acid treatment with other methods; however, by the process of this invention, i.e., by the nitric acid treatment according to the process described above, a silica-free catalyst is obtained having the inventive high crush strength after steaming comparable to the high crush strength obtained by the conventional employment of silica which undesirably includes a non-volatile impurity.

In the practice of the above-described process of this invention, the precipitated alumina is preferably washed and filtered through one or more stages, and preferably water is thereafter added in an amount sufficient to obtain a solids content of from about 10% to about 20%, prior to the nitric acid treatment.

Instead of admixing the promoters into the extruder feed, another alternative procedure is to subsequently impregnate the calcined extrudate with promoters.

Promoter levels may be varied as dictated by the intended use of the formed catalysts. The preferred promoter levels normally range around 3% of cobalt oxide, or 3% nickel oxide, employed normally with about 15% molybdenum oxide.

Applicants' preferred catalysts are extruded through a die of from about 1/16 inch diameter up to about 1/8 inch diameter.

It is within the scope of the invention to employ the extrudate in varying lengths, ranging from pellets to strands of extended length.

By the inventive processes described above, the novel catalyst is obtained having a high degree of retention of crush strength after regeneration as is evidenced by the bulk crush strength tests previously described based on the percentage fines obtained when the catalyst is subjected to a standard degree of crushing conditions.

The following examples illustrate the invention described above, and do not limit the scope of this invention except (1) as limited in the appended claims, or (2) as otherwise stated in the disclosure.

The crush strength of fresh particulate catalyst is measured by applying a measurable, steadily increasing force to a single particle, which is held between two flat parallel plates, and noting the point where the particle fails. The procedure is repeated for a number of particles, and the "crush strength" of the material is reported as the average crushing force required. When the crushing force is applied through an air cylinder with a one square inch piston, the crushing force is read directly from a suitably connected pressure gauge (p.s.i.).

Such a device has been found to be convenient for the measurement of freshly prepared catalyst. The particles are quite strong and the crushings are abrupt and easy to measure. This is not the case, however, with many catalysts which have been regenerated or subjected to simulated regenerations (steamings). In such cases, the weaker particles deform with increasing crushing force and there occurs no sharp break. In addition, the crush strengths are often too low to permit satisfactory measurement. It has become the practice, therefore, to employ a bulk crushing test for the evaluation of regenerated and steamed catalyst.

The bulk crush strength involves placing 10 grams of the test catalyst into a cup with a square inch circular cross section, applying a 200 lb. force to the catalyst for 5 minutes through a free fitting piston, and determination of the fines formed due to the crushing. The bulk crush strength is reported as the percent of fines formed. It has become standard practice here to use a number 16 U.S. Standard Testing sieve for the evaluation of 1/16" diameter extruded catalysts, and a number 8 U.S. Standard Testing sieve for the evaluation of 1/8" diameter extruded catalysts. There is no theoretical reason for the above choices, nor are values attained comparable. It has been found that 1/8 and 1/16 inch particles may not be compared to each other directly by this test. Comparisons between various preparation at the same diameter must be made. It has been found that the quantity of fines produced by a 1/8 inch diameter catalyst number 8 sieve, is far greater than the fines produced by an equivalent 1/16 inch diameter catalyst, number 16 sieve, despite the fact that the inherent strength of the two are equivalent.

It should be noted that stronger materials produce "fewer" fines in this test.

The catalyst regeneration is simulated by a steam treatment in which a 100 cubic centimeter sample of the catalyst is subjected to a flow of 60 grams per hour of steam for 17 hours at 1300° F. and atmospheric pressure. It should be noted that this treatment is usually more severe than typical refinery regenerations, but differences between various catalysts are more immediately apparent.

Examples 1 through 3, as illustrated in the table, are controls in which no nitric acid treatment and no silica treatment was employed, and in which nickel and/or cobalt catalysts were employed. Examples 1 and 2 employed a die size of 1/16 inch diameter, while Example 3 employed a die of 1/8 inch diameter. The results are shown in the table below.

EXAMPLE 1

Sufficient alumina trihydrate, $Al_2O_3 \cdot 3H_2O$, is reacted with sufficient sodium hydroxide and water to prepare 1230 lbs. of sodium aluminate solution containing 28% $Al_2O_3$ according to the reaction:

Alum was prepared according to the following reaction:

1230 gallons of water, at 90–100° F., are placed in a 3200 gallon tank to act as a heel and the alum and aluminate streams are simultaneously introduced so that the pH is between 7.5 and 8.5 and the alum addition takes about 1 hour. After the alum has been added, sufficient additional aluminate is added to raise the pH to about 10.5.

The slurry is then filtered and washed, and repulped to produce a slurry at 7–8% $Al_2O_3$. The pH is adjusted to about 7.0–7.5 and again filtered and washed. The resulting filter cake contains 10–15% of $Al_2O_3$, about 0.02% $Na_2O$ and about 0.2% $SO_4$. This is repulped with additional water to make a washed slurry which is spray dried to about 70% solids.

A portion of the spray-dried powder is mixed with sufficient water to make about a 40% solids mixture, mulled for about 1 hour in a muller, and extruded through a screw extruder fitted with a die whose holes were about $1/16$ inch in diameter. The wet extrudates are dried in an oven, at about 250° F., and calcined at about 1300° F. for about 1 hour.

A portion of the extrudates is impregnated with soluble nickel and molybdenum compounds to give a catalyst which contained about 3% NiO and about 15% $MoO_3$, on a dry basis. After drying at about 250° F., the catalyst is calcined at about 900° F. for about 1 hour.

EXAMPLE 1a

A second portion of the calcined extrudates of Example 1 is impregnated with soluble cobalt and molybdenum compounds to give a catalyst which contained 3% CoO and 15% $MoO_3$ on a dry basis. After drying at 250° F., overnight, the catalyst is calcined at about 1250° F., for one hour.

EXAMPLE 2

A second portion of the spray-dried powder of Example 1 is blended with sufficient soluble cobalt and molybdenum salts, to give a catalyst composition similar to Example 1a, and water and mulled for about 1 hour. This is then extruded through a screw extruder fitted with a $1/16$ inch die, dried at 250° F., and calcined at about 1250° F.

EXAMPLE 3

A second portion of the mulled mixture of Example 2 is extruded through $1/8$" holes, dried and calcined at 1250° F.

Examples 1, 1a, 2, and 3 are prepared from unmodified aluminas, and are used as controls in the comparison of the catalyst made by this invention. It should be noted that the crush strength loss on steaming is independent of either the method of promoter addition or to the nature of the catalytic combination (nickel-molybdenum or cobalt-molybdenum). The pertinent properties of these preparations and those which serve to demonstate the utility of this invention are presented in the table. It should also be noted that steamed fines of about 60% is typical for unmodified $1/8$ inch diameter nickel, or cobalt-molybdenum catalysts, and that steamed fines of about 31% is typical of unmodified $1/16$ inch diameter catalysts.

EXAMPLES 4–11

In Examples 4 through 11 and 19, dies of $1/16$ inch and $1/8$ inch diameter were employed. In Examples 6 through 11, the catalysts were prepared by the process of this invention, employing nickel or cobalt promoters, and obtained the improved crush strength as shown in the table below.

EXAMPLE 4

One thousand grams of the spray-dried alumina of Example 1 is blended with 936 grams of water and 20 grams of 70% nitric acid and mulled for about one hour and, then, dried at 250° F. and calcined at 1300° F. as before. The calcined extrudates are impregnated with soluble cobalt and molybdenum compounds and calcined at 900° F. It should be noted that the base extrudates contain 2% $HNO_3$ based on the $Al_2O_3$ present.

EXAMPLE 5

Sufficient nitric acid is added to a portion of the spray-dried alumina of Example 1 to make a 2% $HNO_3$ mixture. To this, cobalt and molybdenum compounds are then added so that the catalyst contains 3% CoO and 15% $MoO_3$ on a dry basis and sufficient water is added to give 46% total solids. The mixture was mulled, extruded through $1/8$ inch holes, dried at 250° F. and calcined at 1250° F.

EXAMPLE 6

A portion of the washed alumina slurry is blended with sufficient nitric acid to make a 2% $HNO_3$ (based on dry alumina) mixture. This is then spray dried. A portion of the spray-dried powder is made into $1/16$ inch nickel-molybdenum catalyst according to the method of Example 1.

EXAMPLE 7

A second portion of the spray-dried powder of Example 6 is made into $1/8$" nickel-molybdenum catalyst according to the method of Example 1.

EXAMPLE 8

Another portion of the spray dried powder of Example 6 is made into $1/8$" cobalt-molybdenum catalyst according to the method of Example 2.

EXAMPLE 9

A portion of the extruder feed of Example 8 is extruded through $1/16$ inch holes to make a $1/16$ inch cobalt-molybdenum catalyst according to the method of Example 2.

EXAMPLE 10

Example 9 is repeated.

EXAMPLE 11

A portion of the washed alumina slurry of Example 1 is blended to make a 5% $HNO_3$ mixture and, then spray dried. A portion of this spray-dried powder is made into $1/16$ inch nickel-molybdenum catalyst according to the method of Example 1.

EXAMPLES 12–18

In these examples, silica was employed as the strength-imparting agent, at varying levels, employing nickel or cobalt promoters. The results are shown in the table below.

EXAMPLE 12

A silica containing hydrogel is made by first diluting sodium silicate, containing 26.5% by weight of $SiO_2$, with water. Dilute sulfuric acid (25% by weight of $H_2SO_4$) is added until the sodium silicate is gelled and continued until the pH of the gel has been reduced to about 3.0 and 3.5. Alum solution, made by the method of Example 1 is added, simultaneously, with this second acid. Sodium aluminate solution, made by the method of Example 1, is added to the silica gel-alum mixture to form a silica alumina gel. The alum and aluminate are added in the same ratio as in Example 1 and in sufficient quantity to prepare a 25% $Al_2O_3$–75% $SiO_2$ (dry basis) hydrogel. The hydrogel is then filtered and washed several times to remove the sodium sulfate. A portion of silica alumina hydrogel is blended with the precipitated alumina slurry of Example 1 to make a 2% $SiO_2$ mixture and the combined slurry is spray dried. A portion of the spray-dried powder is then made into a $1/16$ inch diameter 3% NiO, 15% $MoO_3$, a catalyst according to the method of Example 1.

EXAMPLE 13

Another portion of the washed silica alumina hydrogel (25% $Al_2O_3$) is blended with the washed alumina slurry of Example 1 and spray dried. The resulting powder contains 5% $SiO_2$ on a dry basis. A portion of this powder is used to prepare $1/16$ inch diameter nickel-molybdenum catalyst according to the method of Example 1.

EXAMPLE 14

Another portion of the calcined extrudates of Example 13 is used to make a $1/16$ inch cobalt -molybdenum catalyst according to the method of Example 1a.

EXAMPLE 15

A portion of the spray-dried powder of Example 13 is used to prepare a 1/16 inch cobalt-molybdenum catalyst according to the method of Example 2.

EXAMPLE 16

A portion of the spray-dried powder of Example 13 is used to make a 1/8 inch cobalt-molybdenum catalyst according to the method of Example 3.

EXAMPLE 17

A portion of the spray-dried powder of Example 13 is used to prepare a 1/16" diameter nickel-molybdenum catalyst according to the method of Example 2. In this case, nickel compounds are substituted for cobalt compounds and the final composition is 3% NiO and 15% $MoO_3$.

EXAMPLE 18

A portion of the extruder feed of Example 17 is used to prepare a 1/8 inch diameter nickel-molybdenum catalyst according to the method of Example 3.

EXAMPLE 19

Sufficient water, nitric acid, and spray-dried alumina of Example 1 are admixed and the mixture is mulled for about an hour. The muller mix does not have the same appearance as the material in the other examples. It is rubbery and difficult to extrude. The extrudates are rubbery, difficult to cut, and develop axial fractures on drying and calcination. Such effects are not encountered with the other preparations. The extrudates are made into catalyst using the method of Example 1.

independent of both catalyst type (NiMo or CoMo) and of method of promoter addition (muller addition or impregnation of calcined extrudates).

It should be noted that the lower the number, the higher the bulk crush strength. It should also be noted that Examples 5 through 11 and 19 as illustrated in the table illustrate that when nitric acid treatment is employed prior to spray drying, a higher crush strength retention is obtained than when nitric acid treatment is at a stage following the addition of aqueous media to the spray-dried alumina in preparation of the extrusion feed, the latter method being referred to in the table as the "muller addition."

The figure discussed above illustrates that the steamed bulk crush strength of untreated catalysts does vary somewhat with the original strength but that the steamed strength of the treated materil is independent of the original strength, and furthermore, that the steamed strength of the treated catalyst is in all cases higher than that of the untreated catalyst. A close examination of the muller treated samples as contrasted to the pre-spray dried treated samples in the figure and the table discloses that the pre-spray dried treated catalyst exhibited a substantially higher degree of crush strength after steaming than the muller treated samples.

Examples 4 through 11 and 19 illustrate the practice of this invention, Examples 1, 1a, 2 and 3 representing controls. Examples 6 through 11 employed the preferred pre-spray drying nitric acid treatment, while Examples 4, 5, and 19 employ the less desirable muller nitric acid treatment. The overall crush strength of both the fresh and the steamed nitric acid-treated catalysts is markedly

TABLE

| Example No. | Extrudate diam. (in.) | Additive type | Additive level, percent [1] | Additive method | Catalyst type [2] | Steamed strength, percent fines |
|---|---|---|---|---|---|---|
| 1 (control) | 1/16 | None | | | Ni and Mo (1) | 32 |
| 1a (control) | 1/16 | ----do---- | | | Co and Mo (1) | 31 |
| 2 (control) | 1/16 | ----do---- | | | Co and Mo (2) | 31 |
| 4 | 1/16 | $HNO_3$ | 2 | Muller, mixed with powder | Co and Mo (1) | 35 |
| 6 | 1/16 | $HNO_3$ | 2 | P. Invention,[3] spray dried | Ni and Mo (1) | 14 |
| 9 | 1/16 | $HNO_3$ | 2 | ----do---- | Co and Mo (2) | 13 |
| 10 | 1/16 | $HNO_3$ | 2 | ----do---- | Co and Mo (2) | 10 |
| 11 | 1/16 | $HNO_3$ | 5 | ----do---- | Ni and Mo (1) | 6 |
| 12 | 1/16 | $SiO_2$ | 2 | Spray dried | Ni and Mo (1) | 10 |
| 13 | 1/16 | $SiO_2$ | 5 | ----do---- | Ni and Mo (1) | 5 |
| 14 | 1/16 | $SiO_2$ | 5 | ----do---- | Co and Mo (1) | 4 |
| 15 | 1/16 | $SiO_2$ | 5 | ----do---- | Co and Mo (2) | 5 |
| 17 | 1/16 | $SiO_2$ | 5 | ----do---- | Ni and Mo (2) | 3 |
| 19 | 1/16 | $HNO_3$ | 6.3 | Muller, mixed with powder | Ni (2) | 25 |
| 3 | 1/8 | None | | | Co and Mo (2) | 60 |
| 5 | 1/8 | $HNO_3$ | 2 | Muller, mixed with powder | Co and Mo (2) | 43 |
| 7 | 1/8 | $HNO_3$ | 2 | P. Invention, spray dry | Ni and Mo (1) | 30 |
| 8 | 1/8 | $HNO_3$ | 2 | ----do---- | Co and Mo (2) | 30 |
| 16 | 1/8 | $SiO_2$ | 5 | Spray dry | Co and Mo (2) | 18 |
| 18 | 1/8 | $SiO_2$ | 5 | ----do---- | Ni and Mo (1) | 9 |

[1] Based on $Al_2O_3$.
[2] (1)=impregnated; (2)=promoter solution mulled with powder prior to extrusion.
[3] P. Invention—The preferred method of this invention.

Conclusions from the table, Examples 1–18

The data in the table show the improvement in strength, after steaming, which results when nitric acid is added at the 2 to 5% level by the method of this invention (Examples 6 to 11). Strengths, after steaming, approximate that which is obtained with the addition of silica (Examples 12 to 18). Nitric acid addition by an alternate procedure (Examples 4, 5 and 19) did not produce an equivalent improvement.

Examples 12 to 18 are included because silica is known to impart the required stability properties to the alumina. These results act as a high strength comparison for the various nitric acid preparations. It should be noted that while silica may impart some degree of cracking activity, nitric acid does not because it leaves no residue on calcination. Example 19 is included to show the practical upper limit of acid addition. It should be noted from the examples in the table that the steamed crush strength is superior for the pre-spray dried treatment, as contrasted to the controls, but is less marked for the muller method. The table conclusively illustrates the high degree of treated catalyst strength in contrast to too low degree (poor) of untreated (control) crush strength, after steaming.

Other suitable changes and variations may be made in carrying out the invention as described herein without departing from the spirit and scope thereof, as defined in the appended claims.

We claim:
1. In a process for producing a fixed bed-type silica-free alumina catalyst having improved crush strength retention after steam regeneration, said process consisting essentially of (1) reacting a hydrated alumina with a sodium hydroxide solution sufficiently to produce a sodium aluminate, (2) reacting a hydrated alumina with sulfuric acid sufficiently to produce aluminum sulfate, (3) admixing reactants comprising said aluminate and said alum at an alkaline pH in the presence of water, sufficiently to substantially form a hydrous slurry, (4) treating said aqueous precipitated alumina slurry with a reactant comprising nitric acid, said nitric acid being employed in an amount sufficient to be effective from about 1 to about 8% based on the total weight of alumina present, (5) drying said slurry, (6) preparing an extrusion feed comprising said treated alumina slurry and a minor amount of a promoter, said promoter comprising molybdenum, said extrusion feed including sufficient aqueous diluent to impart extrusion plasticity, (7) extruding said extrusion feed, and (8) drying and calcining said extrudate.

2. The process of claim 1 wherein said promoter comprises in addition a member selected from the group consisting of nickel and cobalt.

3. The process of claim 1 wherein said nitric acid is added in an amount from about 2 to 5%.

References Cited

UNITED STATES PATENTS

| | | | |
|---|---|---|---|
| 2,809,170 | 10/1957 | Cornelius et al. | 23—143 X |
| 2,973,330 | 2/1961 | Hinlicky et al. | 252—466 |
| 2,980,632 | 4/1961 | Malley et al. | 252—465 |
| 3,020,243 | 2/1962 | Reitmeier | 252—465 |
| 3,020,245 | 2/1962 | Reitmeier | 252—465 |
| 3,025,248 | 3/1962 | Oleck et al. | 252—466 |
| 3,032,514 | 5/1962 | Malley et al. | 252—465 |
| 3,086,845 | 4/1963 | Malley et al. | 23—143 |
| 3,104,228 | 9/1963 | Vance et al. | 23—465 |
| 3,124,418 | 3/1964 | Malley et al. | 23—143 |
| 3,213,040 | 10/1965 | Pedigo et al. | 252—465 |

OSCAR R. VERTIZ, *Primary Examiner.*

G. T. OZAKI, *Assistant Examiner.*